(12) United States Patent
Gagnon

(10) Patent No.: US 6,769,018 B2
(45) Date of Patent: Jul. 27, 2004

(54) SYSTEM AND METHOD FOR PROVIDING EASY ACCESS TO THE WORLD WIDE WEB

(75) Inventor: Eric F. Gagnon, Warrenton, VA (US)

(73) Assignee: Internet Media Corporation, Warrenton, VA (US)

(*) Notice: Subject to any disclaimer, the term of this patent is extended or adjusted under 35 U.S.C. 154(b) by 0 days.

(21) Appl. No.: 10/209,915

(22) Filed: Aug. 2, 2002

(65) Prior Publication Data

US 2002/0194270 A1 Dec. 19, 2002

Related U.S. Application Data

(63) Continuation-in-part of application No. 09/496,272, filed on Feb. 1, 2000, now abandoned, which is a continuation of application No. 08/705,967, filed on Aug. 30, 1996, now Pat. No. 6,049,835.

(51) Int. Cl.[7] .................................................. H04N 7/73
(52) U.S. Cl. ...................... 709/218; 709/217; 709/219; 705/23; 705/26
(58) Field of Search .......................... 709/217, 1, 219, 709/245; 705/1, 23, 26; 235/462.01

(56) References Cited

U.S. PATENT DOCUMENTS

| | | |
|---|---|---|
| 4,706,121 A | 11/1987 | Young |
| 5,526,127 A | 6/1996 | Yonetani et al. |
| 5,572,643 A | 11/1996 | Judson |
| 5,612,730 A | 3/1997 | Lewis |
| 5,625,781 A | 4/1997 | Cline et al. |
| 5,659,729 A | 8/1997 | Nielsen |
| 5,694,163 A | 12/1997 | Harrison |
| 5,708,780 A | 1/1998 | Levergood et al. |
| 5,764,906 A | 6/1998 | Edelstein et al. |
| 5,804,803 A | 9/1998 | Cragun et al. |
| 5,978,773 A * | 11/1999 | Hudetz et al. ................. 705/23 |
| 6,012,102 A * | 1/2000 | Shachar .......................... 710/5 |
| 6,076,071 A * | 6/2000 | Freeny, Jr. .................... 705/26 |
| 6,148,289 A * | 11/2000 | Virdy ............................... 705/1 |
| 6,148,331 A * | 11/2000 | Parry .......................... 709/218 |
| 2002/0185537 A1 * | 12/2002 | Konda .................... 235/462.01 |

FOREIGN PATENT DOCUMENTS

| | | |
|---|---|---|
| EP | 0 697 793 A2 A3 | 2/1996 |
| FR | WO-01/89238 A1 * | 11/2001 |
| WO | WO 97/01137 A1 | 1/1997 |
| WO | WO 97/19564 A2 A3 | 5/1997 |

OTHER PUBLICATIONS

"Distributing Uniform Resource Locators as Bar Code Images," *IBM Technical Disclosure Bulletin*, vol. 39, No. 01, Jan., 1996, p. 167.

The Jump Code Numeric Access System, http://www/jump-code.com/broadcast.html, *Exploit Profitable New Advertise Services by Linking Your Print Advertisers to the Internet*, Jul. 23, 2002.

The Jump Code Numeric Access System, http://www.jump-code.com/broadcast.html, *Link your On–Air Operations to Your Net–and Set–Top Box Services*, Jul. 23, 2002.

The Jump Code Numeric Access System, http://www.jump-code.com/newspapers.html, *Open Up Profitable New Advertising Services for Your Newspaper's Classified and Display Advertising Operations with the Jump Code System.*

* cited by examiner

*Primary Examiner*—Wen Tai Lin
(74) *Attorney, Agent, or Firm*—Blank Rome LLP

(57) ABSTRACT

A system for quickly and easily accessing preselected desired addresses or URLs on the Internet is disclosed in which a unique jump code for a particular desired address is published by printing it in an advertisement in a Yellow Pages directory or in a newspaper advertisement or by announcing it during a television or radio program. The user enters the jump code into an Internet location for receiving it, e.g., the home page of the Yellow Pages publisher, to access the desired address without typing the full URL. The user can then receive more information, promotional coupons, or the like.

24 Claims, 6 Drawing Sheets

SYSTEM AND METHOD FOR PROVIDING EASY ACCESS TO THE WORLD WIDE WEB

REFERENCE TO RELATED APPLICATIONS

The present application is a continuation-in-part of U.S. patent application Ser. No. 09/496,272, filed Feb. 1, 2000, now abandoned, which is a continuation of U.S. patent application Ser. No. 08/705,967, filed Aug. 30, 1996, now U.S. Pat. No. 6,049,835. The disclosures of the above-referenced applications are hereby incorporated by reference in their entireties into the present application.

FIELD OF THE INVENTION

The present invention is directed to a system for providing users of the Internet with easy access to the World Wide Web. More particularly, the present invention is directed to providing a central location which World Wide Web users of the Internet can reach and can then instruct to provide them with ready access to a particular location on the World Wide Web portion of the Internet.

DESCRIPTION OF RELATED ART

Use of the Internet, a worldwide network of millions of computers in more than a hundred countries, has become a major communications and information medium influencing many aspects of business and personal life. At the present time, almost every large corporation, university, government, organization, and many businesses and individual users around the world are connected to and have access to the worldwide network known as the Internet. The Internet is a collection of individual computer networks which are connected to each other by means of high-speed telephone and satellite data links, and which are all connected by a public-domain communications software standard.

The Internet was developed in the late 1960s, when it was established by the United States Defense Department as a research project for use by defense contractors and universities. The purpose of the Internet at that time was to create a military computer network which could still function reliably if any parts of it were destroyed in a nuclear war. A series of standardized communications protocols for sending information around the computer network were developed in order to ensure against the inherent unreliability of telephone lines and exposed telephone switching stations.

For over 25 years, the Internet was used primarily as a research-oriented computer communications network for universities, defense contractors, governments, and organizations in science and academia. During those years, it grew slowly but steadily, and its proved, freely available communications protocols were also adopted by the computer and telecommunications industries and by large corporations, who used the Internet for electronic mail communications between and among their companies. In 1992, the United States Government turned over operation of the Internet's high-speed data links to commercial communications networks. That transfer, as well as the concurrent explosion in the use of personal computers, local area networks, bulletin boards systems, and consumer-oriented on-line services, caused the Internet to grow tremendously. Because of the convergence of those events, a critical mass for acceptance of the Internet as a standard means for the worldwide connection of individual computer networks of all kinds and sizes was created.

One of the reasons for the explosive growth of the Internet is the widespread acceptance of the Internet as the standard for electronic mail. The Internet is also well known for its two other main features, its Usenet newsgroups, which constitute thousands of on-line discussion groups covering a wide variety of business, personal, and technical subjects, and perhaps the most commercially important Internet phenomenon, the World Wide Web. The Internet is also increasingly used for real-time chat.

The World Wide Web or Web, as it is more commonly known, is a standardized method of combining the display of graphics, text, video and audio clips, as well as other features, such as secure credit card transactions, into a standardized, graphical, friendly interface that is easy for anyone to use. That is in contrast to the use of the Internet for electronic mail, which primarily consists of rapid text-based communications among individuals.

The Web was designed by a British scientist in 1991 as a way to let researchers easily publish scientific documents online. The creation of the first point-and-click software for "browsing" the Web, known as Mosaic, by the University of Illinois, enabled ready access to the Web by non-technically skilled users. Then, commercial companies, such as Netscape Communications Corporation, developed more sophisticated Web browsers, such as Netscape's Navigator. Another Web browser is Internet Explorer from Microsoft Corporation, which is distributed with Microsoft Windows. Web browsers are also provided by well-known major on-line computer services such as America Online (AOL) and the Microsoft Network (MSN).

The standard protocols which define the Web work in combination with a Web browser which runs on personal computers and handles the chores of accessing and displaying graphics and texts, and playing back video and audio files found on the Web. In addition to providing Web access, Web browsers and the Web tie together all the Internet's other useful features that existed before the advent of the Web, such as the newsgroups, FTP text file access, and, of course, sending or receiving electronic mail.

The World Wide Web standards are essentially a text coding, or "mark-up" method, where selected elements in a text file, such as article headlines, subheads, images and important words highlighted in the body of a text file can, by the insertion of special, bracketed codes (called HTML or Hyper Text Mark-up Language codes), be turned into hot links that are easily and instantly accessible by anyone with a Web browser.

The World Wide Web is considered by many to be the true information superhighway. In fact, the World Wide Web is such an important aspect of the Internet in most people's minds that the terms "Internet" and "World Wide Web" are popularly (but incorrectly) used as synonyms. The World Wide Web lays the foundation for the use of the Internet as an entirely new broadcast medium, one which provides individuals, groups, and companies with unprecedented new opportunities for broadcast communication. For example, it is now fairly easy to create one's own Web site or address on the Web such that all users on the Internet can reach it. The Web thus provides an outlet for anyone who desires to self-publish articles, graphics, video clips, and audio files over the net. Since any individual Web site can be freely accessed by anyone else with Web access, anyone who creates a Web site has a form for broadcasting their information, news, announcements, or creative works to an audience of millions. In addition, communication by Internet electronic mail can be established by any member of this audience with the author of a Web site, thus providing a new level of two-way communication to this new broadcast medium.

Because the Web provides several key benefits for Internet users, those benefits are encouraging the explosive growth of the Web and, ultimately, the acceptance of the Internet as the world's de facto computer communications medium.

First, using the Web is simplicity itself. Compared to the confusing Unix based commands which were once required to use the Internet, using a Web browser provides the user with the same friendly, graphical point-and-click access to all the Internet's features that the users have come to expect from any good stand-alone Windows commercial software product. Once a user has accessed the Web, any of the millions of Web sites and their linked articles, text articles, graphic images, video/audio clips, extensive software libraries, and communications features are easily accessible with a click of the user's mouse key. In addition, any good Web browser software also opens up the Web's multimedia potential by providing users with instant and automatic access to helper applications software that automatically plays video and sound clips. Such multimedia potential has become a big attraction on the Web.

Web browsers also have a bookmark or favorites feature, which allows the user to capture and save the location of any Web site that is visited, so that such sites can be readily reaccessed by clicking on it from the user's Web browser at any time.

Using the Web, users can get instant access to many types of information, entertainment, and interactive resources which are now available on the Web. Because of the explosion of newly created Web sites, the user can get access to useful, practical information on an almost infinite variety of subjects. The Web also provides an instant connection to millions of other people on the Internet. The resources which may be found on the Web are almost limitless.

In order to understand the use and operation of the Web, it is believed that certain terms that will be used herein should be defined. A Web browser, as previously discussed, is a software program used to access the Web; typically, it is a graphical, Windows-based software program which is used on a personal computer to access the Web. A Web site or Web page (terms often used interchangeably, although, as noted below, they are not strictly synonymous) describes an individual location on the Internet containing a single Web-published feature. A Web site is basically a collection of files located under a directory somewhere on someone's computer connected to the Internet. A Web site may consist of one Web page or of many Web pages, and usually also includes on-screen graphics, pictures, texts and video and audio clips, or an archive of software that can be downloaded, stored and used freely on the visitor's own personal computer.

Frequently, Web pages utilize links or hot links, two terms which are used interchangeably, to describe words or groups of words which are highlighted on Web pages. When a visitor clicks on a link with his mouse, he is immediately linked to another Web site or location on the current Web site containing the information that is referred to by the link. Any single Web site may contain dozens, hundreds, or even thousands of hot links, both to other sections within the same site or to other Web sites located anywhere else in the world.

Some Web pages also include a links page which consists of lists of links to many other Web sites. These are often a Web site author's favorite sites or feature links to Web sites pertaining to a specific subject.

Every Web site has an exact address, or location on the Web. Such addresses are known as a Uniform Resource Locator or URL. URLs consist of a confusing string of subdirectories, files or executable commands, separated by slashes, which are extremely difficult to work with and which must be typed into the user's Web browser exactly as they appear, including the use of upper and lower-case letters, in order to go to a Web site. While clicking on hot links will get the user to a Web site without having to type in a URL or copying a URL from a text file (if it is located on the user's computer) and pasting it into the user's Web browser-screen, can save the user from this arduous task, the use of URLs has become the bane of the use of the Web.

Another difficulty with Web addresses is faced by advertisers who desire to use the Internet to provide their potential customers with targeted promotional offers and other highly specific information in connection with their ongoing marketing programs. For example, a company wishing to print an Internet Web address in its print advertising, featuring a link to a special promotional offer available to readers of that advertisement, or a link to a Web page containing information which is highly specific to the individual product being advertised, would ordinarily have to include a long Web address in its advertising, which the reader of the ad would have to enter, manually, to reach the specific promotional or informational Web page on the Internet, referenced by the company's advertisement.

This problem increases with the size of the company's marketing programs. For example, a large company with a large product line and an extensive nationwide advertising program may wish to offer readers of its print advertising many highly targeted Internet links; for example, with links to special promotions offered only in certain regional areas, or for a certain products, or to provide other highly specific information which is pertinent only to readers of a particular advertisement placed in a limited number of print publications. Ordinarily, to provide such links, this large company would have to print a long Web address in each of its print advertisements to link the reader of the ad directly to the pertinent, highly specific Web-based information on the company's product. Readers of the company's print advertising would find it a very tedious and difficult process to enter these long Web addresses. Because of this problem, most advertisers, regardless of the sizes of their advertising budgets, are unable to realize the full potential of the Internet's ability to provide their potential customers with instant, targeted promotional offers and other useful, highly-specific product information.

SUMMARY AND OBJECTS OF THE INVENTION

In light of the above-described drawbacks of accessing the World Wide Web, it is clear that there is still a need in the art for a system for quickly and easily accessing selected beneficial sites or addresses on the World Wide Web portion of the Internet.

Therefore, it is a primary object of the present invention to provide a system by which users of the World Wide Web portion of the Internet can readily access preselected Web sites or Internet addresses, after they have gained access to the World Wide Web portion of the Internet. More particularly, it is an object of the present invention to provide a specialized Web site which can be used in conjunction with published jump codes to readily and automatically access other Web sites or Internet locations, without the user having to remember or input the URL of the desired Web site.

Even more particularly, it is an object of the present invention to provide a printed publication containing descriptions of selected Web sites or addresses together with jump codes therefor which can readily be used in conjunction with a specialized Web site which includes software which, upon recognizing the inputted jump code, quickly and automatically accesses the desired Web site.

It is a further object of the present invention to be able to use the system of the present invention with any one of personal computers connected to the Web, Television Internet Terminal devices, wireless devices, or any other electronic device which can be used for Internet access.

The system of the present invention utilizes a published list of preselected Web sites. Each of the selected Web sites is assigned a specific jump code (of four digits in one particular embodiment). A user desiring to access one of the preselected Web sites first gains access to the World Wide Web, using a Web browser, by accessing a special Web site which contains software for receiving any of the published four-digit jump codes and, based upon the stored relationship of the URLs corresponding to the input jump code, directly accesses the Web site corresponding to the jump code inputted by the user.

In the case of so-called "set top" TV Internet Terminals, the user accesses the specialized Web site using the TV Internet Terminal and then enters the desired jump codes using a remote control which is similar to a standard television channel selector. In that manner, users with the TV Internet Terminal will be able to access the desired Web sites using their television, the TV Internet Terminal, and the remote control push buttons.

Of course, the invention is usable with any device capable of accessing the Internet, such as a personal computer, a set-top device, or a WAP-enabled mobile device. That device can access the Internet in any way; for example, it is contemplated that home users will typically use dial-up access, DSL, or a cable modem.

The published compilation of preselected Internet locations is published in any of a variety of ways. One example is a localized printed Yellow Pages telephone directory published in a localized metropolitan area, in which case the unique predetermined jump code is published within a printed display advertisement in the localized Yellow Pages telephone directory published for a localized metropolitan area. The unique predetermined jump code can be published within any printed display advertisement for a restaurant business establishment, in which case the printed display advertisement is published in the "Restaurants" category of the localized Yellow Pages telephone directory published for a localized metropolitan area. The same can be done for a doctor's office or health care provider, an automobile dealership, a local retail store, or any other business that advertises in the Yellow Pages.

Another example is that of newspaper advertisements. In that example, the published compilation of preselected Internet locations is published as a printed newspaper published for a localized metropolitan, area, in which case the unique predetermined jump code can be published within a printed display advertisement in the newspaper. Alternatively, it can be published in a text classified advertisement, e.g., a "Classifieds-For Sale," "Real Estate," "Help Wanted," or similarly-worded classified advertising category.

Still other embodiments concern the characteristics of the desired preselected Internet location. For example, in one such embodiment, the desired preselected Internet location displays a viewable screen which contains one or more promotional savings coupons or other promotional offers, which are displayed to the user after entry of the jump code corresponding to the desired preselected Internet location. In another, the desired preselected Internet location displays a viewable screen which contains an on-screen map and/or text providing the user with directions to the location of the advertised business establishment, which is displayed to the user after entry of the jump code corresponding to the desired preselected Internet location. In still another, the desired preselected Internet location displays a viewable screen which contains a photograph of the actual advertised item being offered for sale by the advertiser, which is displayed to the user after entry of the jump code corresponding to the desired preselected Internet location. In yet another, the desired preselected Internet location displays a viewable screen which contains an HTML-based hyperlink which provides for transmission of an electronic document file, which is displayed to the user after entry of the jump code corresponding to the desired preselected Internet location. As one particular example, the electronic document file to be transmitted can be a resume to be sent to a prospective employer. Technologies for providing coupons, maps and the like over the Internet are well known in the art and will therefore not be described in detail here; however, their use in conjunction with the present claimed invention is considered to be novel.

In the cases involving Yellow Pages and newspapers, a specific URL for entry of the jump code can be assigned to each publication and printed in the publication. Similarly, if jump codes are published over broadcast media, such a URL can be assigned to each network or to each station. In that manner, jump codes can be reused from publication to publication (network to network, etc.) with no fear of confusion.

With these and other objects, advantages and features of the invention that may become hereinafter apparent, the nature of the invention may be more clearly understood by reference to the following detailed description of the invention, the appended claims and to the several drawings attached herein.

Another problem solved by at least one embodiment of the invention is the need for print publishers and advertisers to link their print readers to very specific Internet addresses from their print publications, for the purposes of offering readers highly specific and targeted Internet-based promotions and specific and useful supplemental information on the advertised item. For example, an advertiser wishing to link a reader to a specific Web address containing additional, highly-specific information on the item or topic being referenced by the advertisement (such as a promotional offer which is targeted specifically to the readers of a particular issue of a publication), is faced with the option of having to print a long Web URL in the print advertisement which references that specific information available at the specific Internet location. Without the use of a jump code which links the reader to the specific Internet location providing this information, the advertiser would have to use additional, costly advertising space to print a long URL in the ad, and would subject the reader to the arduous task of having to enter this long URL to reach this Internet location. Since entry of long URLs can be a confusing task that is subject to a high probabilility of error, and since URLs must be entered in exactly by the user to reach the Internet location, a reader who mis-types this URL will be unable to reach the desired Internet location.

A short, 4- or 5-digit jump code printed in display or text classified advertisements, which links the reader to the specific Web address containing the promotional or other highly-specific information referenced in the advertisement, makes it much easier for the user to reach the specific Internet location containing the promotion or information desired by the user. By mapping a highly specific Web link to an easily-entered jump code, an advertiser can also offer a promotion which is highly targeted to the advertisement placed in the specific issue of the publication, and is able to offer promotional opportunities or useful supplemental information to the reader that are highly specific to the advertising placement in that specific issue of the printed publication.

BRIEF DESCRIPTION OF THE DRAWINGS

Various preferred embodiments of the present invention will be set forth in detail with reference to the drawings, in which.

DETAILED DESCRIPTION OF THE PREFERRED EMBODIMENTS

Figure 1:
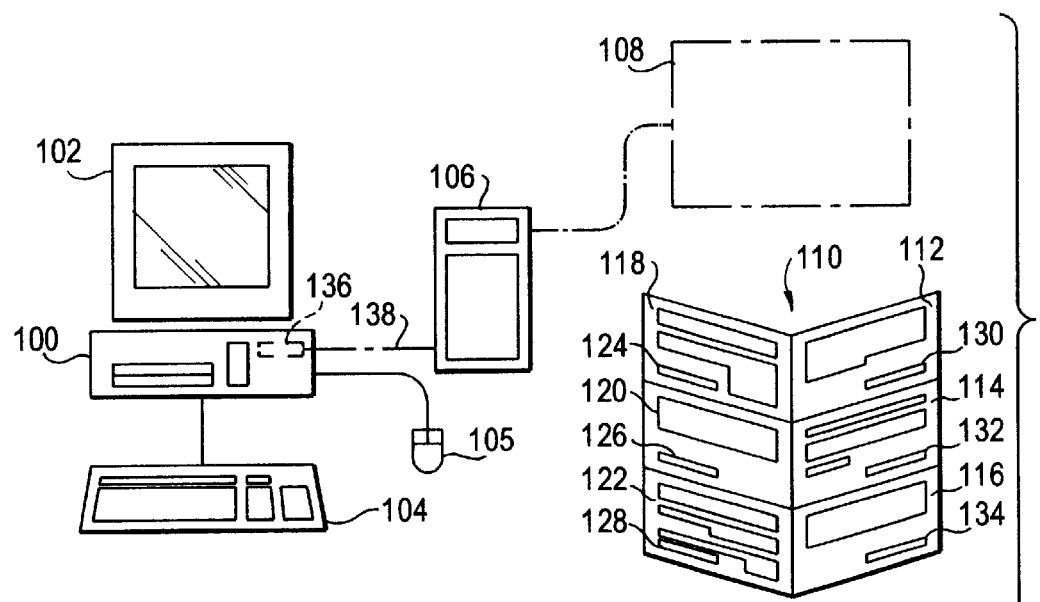
FIG. 1 shows, in schematic block diagram form, the inventive system of the present invention for use in connection with personal computer access to the Internet.

Referring now to the figures, wherein like reference numerals designate like elements throughout, there is shown in FIG. 1 the system of the present invention for use in connecting to the Internet by means of a personal computer. A personal-computer 100, having a Web browser, is connected by means of a modem 136 by means of a telephone line or other communications medium, to a server computer 106 which provides access for the personal computer 100 directly to the Internet. The personal computer 100 includes a video monitor 102, as well as a keyboard 104 and a pointing device, such as a mouse or track ball, 105. Once the user has connected to the Internet, he accesses the specialized Web site 108, by entering the URL for that Web site. A specialized Web site for use as part of the inventive system disclosed herein could have any URL (and indeed would, of necessity, have to have its own URL), the only requirement being that the URL be disseminated in conjunction with the dissemination of the jump codes to be used therewith. As will be explained in detail below, in various preferred embodiments, a specific specialized Web site having its own URL is assigned to each Yellow Pages directory or series of directories, to each newspaper, or to each television or radio station or network.

The Web site 108 contains software which is capable of accepting a four-digit jump code, looking up the corresponding URL for the Web site denoted by that jump code in a stored data base, and then for immediately and automatically accessing that URL or Web site. Various existing technologies, such as the common gateway interface (CGI), can be used.

In order to provide Web users with the jump codes, it is preferable that a printed publication which contains preselected Internet locations based on certain criteria be disseminated so that the jump codes associated with each of the preselected Web sites can be easily determined by the users. Such a book or other publication 110 can be published specifically to provide jump codes or, as will be explained in detail below, can be a Yellow Pages directory or newspaper into which jump codes have been incorporated. The publication 110 contains a plurality of entries 112, 114, 116, 118, 120, and 122, each of which has a corresponding four digit jump code 124, 126, 128, 130, 132, and 134, associated therewith. After the user is on-line with the specialized Web site 108, entering the four digit jump code will instantly link the Web site corresponding thereto to the specialized Web site, thus providing immediate access to the desired Web site for the user. There is no need to determine, nor input, the URL or address of the Web site which is desired to be accessed. As will be explained in detail below, the printed publication can take the form of a Yellow Pages directory or a newspaper, in which case the jump codes are presented in the context of the ordinary content of such a publication, e.g., display or classified advertisements or editorial content. Further, the jump codes can be published in a television or radio broadcast.

As discussed above, in addition to Web sites, any other type of subject matter contained on the Internet which has a URL, can be accessed using the jump code provided therefor. An example of such an additional use is the accessing of newsgroups, or Usenet Internet discussion newsgroups, where on-line discussions on thousands of subjects can be attained. Such newsgroups can also be accessed by means of the specialized Web site 108. A listing of such newsgroups together with their assigned jump codes can be accomplished in a manner similar to that for the Web sites.

In order to use the Internet access system of the present invention, as discussed above, the user first must access the specialized Web site 108 which is maintained for exclusive use in connection with the publication 110 which contains the preselected Web sites 112–122 and their corresponding jump codes 124–134. The only URL the user need ever input in order to access any of the preselected (and best available) Web sites in the publication 110 is the URL of the specialized Web site 108. After the specialized Web site 108 has beer; accessed, the user enters the four-digit jump code (obviously a larger number of digits could be utilized in order to enable the accessing of a larger number of Web sites or newsgroups or other URL locations on the Internet) which corresponds to the selected Web site, Internet link, or other address the user desires to access. The jump code is entered in a standard on-screen HTML box or form which is then read by software resident on the specialized Web site 108. This software program searches through its database of URLs, and finds the URL which is linked to the input jump code. The software then links the user either directly to the desired Internet link, By entering a simple four-digit code, the user is much more easily and conveniently able to access the desired Web sites, as compared to the standard method of accessing those Web sites, which requires the error-prone, tedious and confusing entry of URLs. The use of the jump codes printed in the printed publication 110 combined with the integrated specialized Web site 108 provides Web users with the fastest possible way of reaching the desired Internet link.

Figure 2:
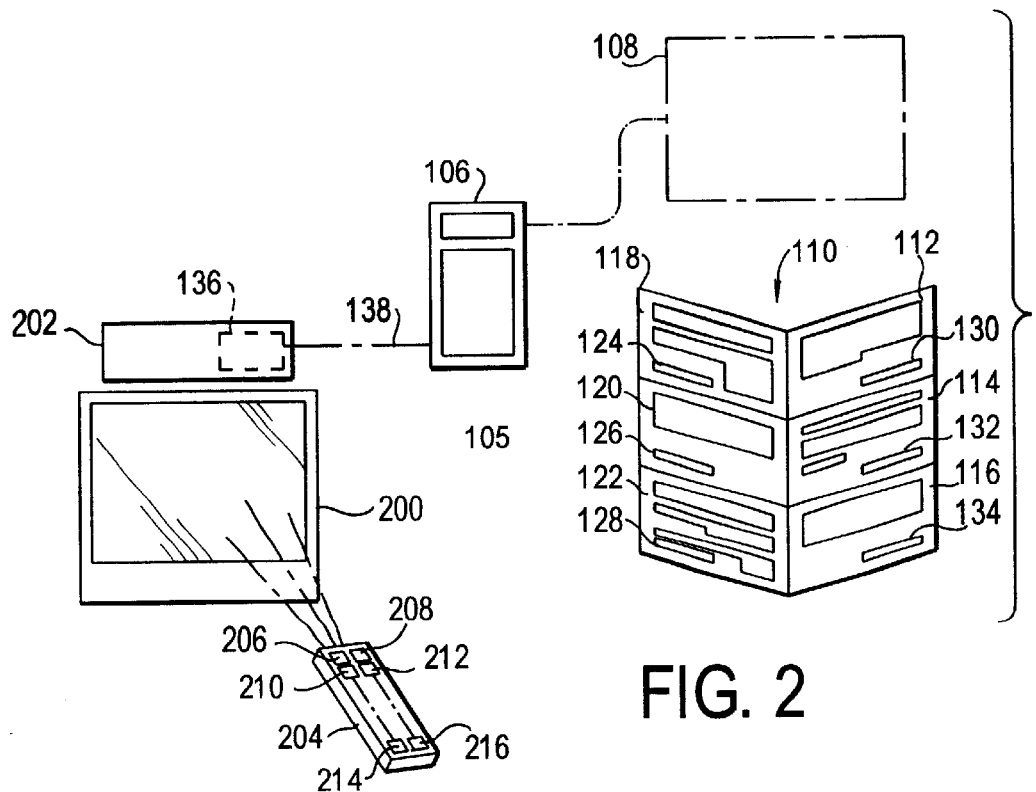
FIG. 2 shows the system of the present invention for use with television Internet terminal access to the Internet.

Referring now to FIG. 2, there is shown the system of the present invention for use with an alternative Internet access hardware and software. Specifically, a set-top TV Internet Terminal 202, such as one which uses software and hardware available from Microsoft Corporation, of Redmond, Wash., and known as a "Web TV Internet Terminal," or "MSN TV Internet Receiver" is utilized, in connection with a standard broadcast television 200. The TV Internet Terminal 202 is connected to the television 200 such that the television functions in the same manner as the video monitor 102, that is, it displays the computer video generated by the TV Internet Terminal 202. The TV Internet Terminal 202, in addition to containing the necessary hardware and software for enabling the television 200 to display computer video, is connected by means of a modem 136 which may also preferably be a cable modem, through a telecommunications medium, such as a telephone line, cable system line 138 or other medium, such as by satellite, or wireless Internet provider, to the server 106 of the Internet access provider. From there the user is able to access the server on which the specialized Web site 108 resides, using the Internet.

The users of the TV Internet Terminal accessing hardware are likewise provided with a publication 110 which contains the same information discussed above in connection with FIG. 1.

In order to access the selected Web sites contained and reviewed in the publication 110, the users of the TV Internet Terminal are provided with a remote control device 204, which has an outward appearance similar to a standard television channel changer but which is designed to work in connection with the TV Internet Terminal 202. For that purpose, a plurality of specialized push buttons 206–216 are provided so that the TV Internet Terminal 202 can be commanded to access the Internet. In particular, in order to access the specialized Web site 108, one of the specialized buttons 206–216 may be a specialized function button which causes the TV Internet Terminal 202 to transmit the URL of the specialized Web site 108. Alternatively, the remote control 204 can contain enough push buttons to enable the user to enter the URL using the push buttons 206–216. After the user has accessed the specialized Web site 108, a jump code is entered followed by the depression of a specialized function key, similar to the enter key of the keyboard 104. In all other respects, accessing the desired Web site as published in the printed publication 110 or as published as an on-line list within the specialized Web site 108, is the same as described above in connection with FIG. 1. Obviously, the design of such a remote control 204 with specialized push buttons and function buttons as well as the TV Internet Terminal 202, will be known to those of ordinary skill in the art.

Various embodiments, based on the system described above, will now be disclosed.

Figure 3A:
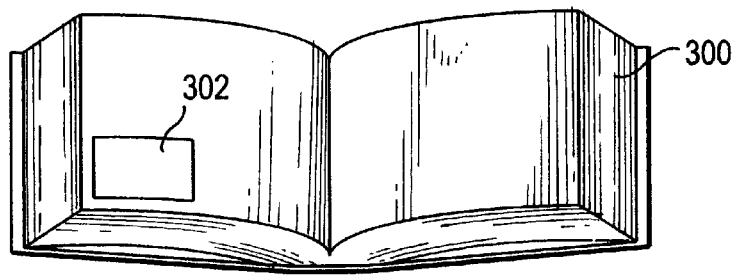
FIGS. 3A–3G show an embodiment of the present invention for use with Yellow Pages telephone directories.
Figure 3B:
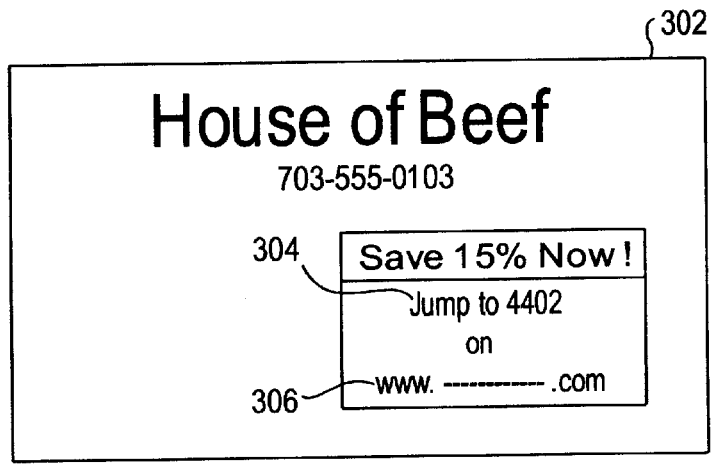

An embodiment of the present invention using a Yellow Pages directory will be disclosed with reference to FIGS. 3A–3G. As shown in FIGS. 3A and 3B, a hardcopy Yellow Pages directory 300 includes a display advertisement 302 (although a text advertisement could be used as well) that includes an indication 304 of a jump code and a URL 306 of a Web site into which the jump code can be entered. In the embodiment of FIGS. 3A–3G, the Web site is specific to the Yellow Pages directory, or to a series of Yellow Pages directories published by the same publisher, so that the jump code has to be unique only within that directory or series of directories. If the jump code had to be unique within all possible uses of jump codes, the jump code might have to be too long to be usable, or at least too long to be widely accepted. In addition to or instead of the hard-copy Yellow Pages directory of FIG. 3A, the publisher may provide a Web-based Yellow Pages directory.

Figure 3C:
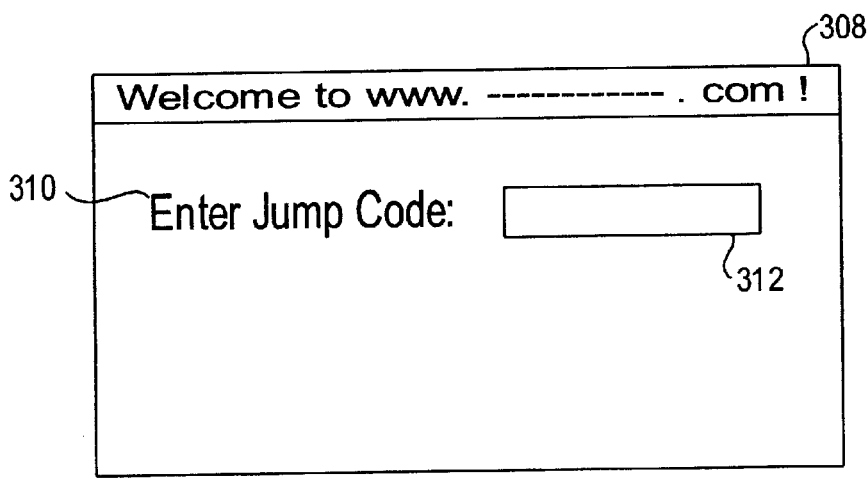
Figure 3D:
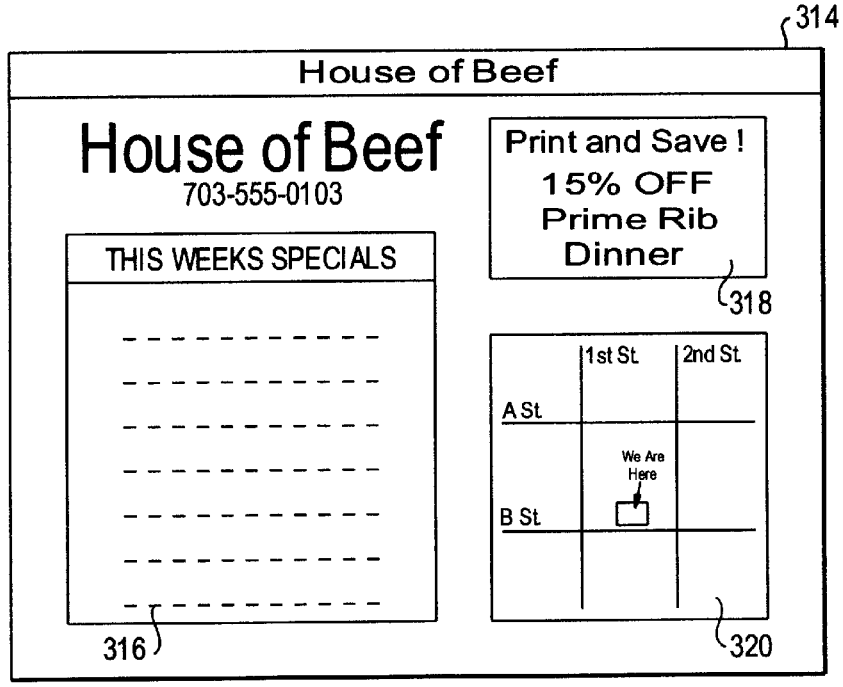
Figure 3E:
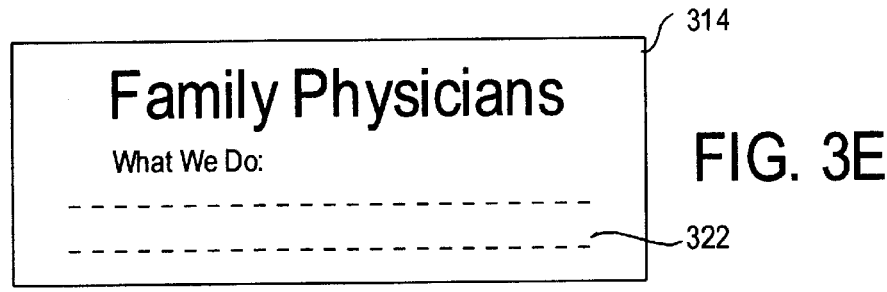
Figure 3F:

When a user accesses the Web site indicated in the advertisement, a Web page 308 appears, as shown in FIG. 3C, with a frame 310 having a box 312 for entry of the jump code. When the user enters the jump code, the user is shown a page 314 specific to the advertiser, as shown in FIG. 3D, which may include such things as a constantly-updated list 316 of menu items and prices, specials, a coupon 318 for an advertised product (in the present embodiment, 15% off a prime rib dinner), and a map 320 to the advertiser's place of business. Text directions to the place of business could be provided instead of, or in addition to, the map.

Figure 3G:

Businesses that can use such an embodiment include not only restaurants, but also physicians (FIG. 3E), automobile dealers (FIG. 3F), and retail stores (FIG. 3G). The page 314 specific to the advertiser can provide such information as a physician's practice profile 322, availability 324 of cars at a dealership, or a menu. Any business, e.g., retail, wholesale, or services, can use such an embodiment.

Figure 4A:
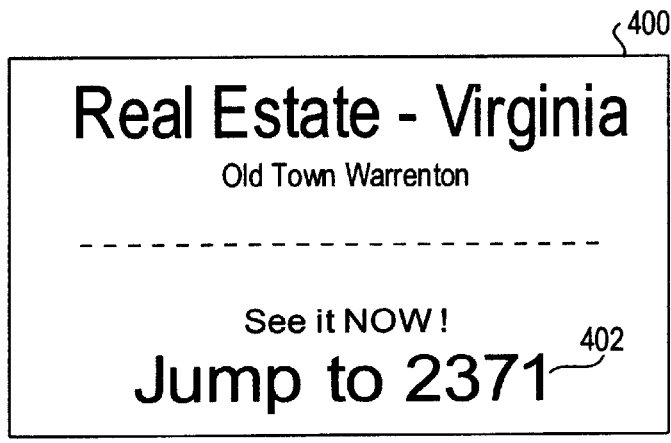
FIGS. 4A–4E show an embodiment of the present invention for use with advertisements in newspapers.
Figure 4B:
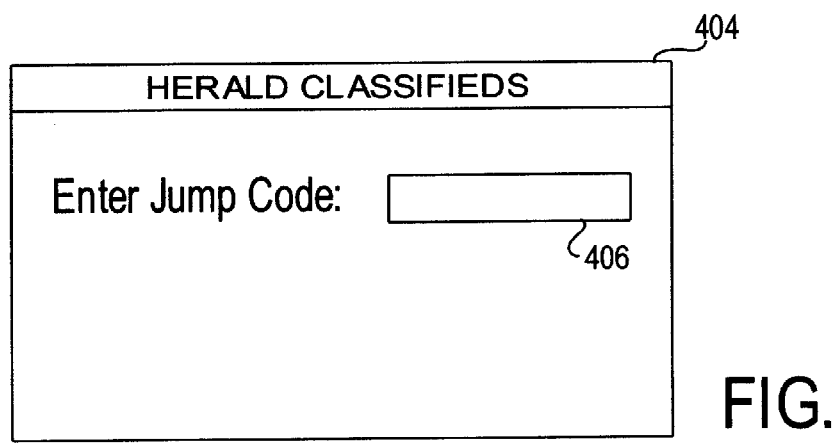
Figure 4C:
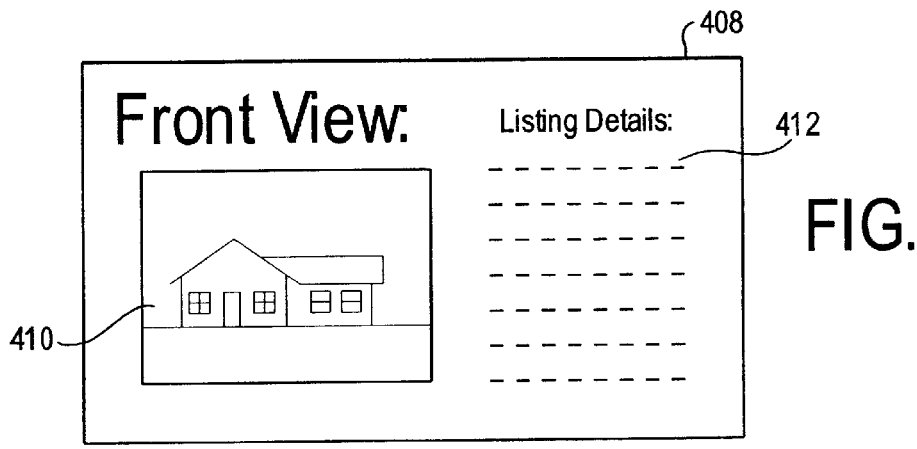
Figure 4D:
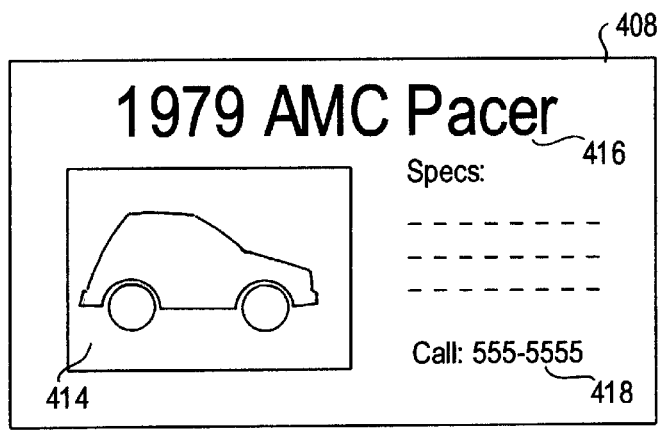
Figure 4E:
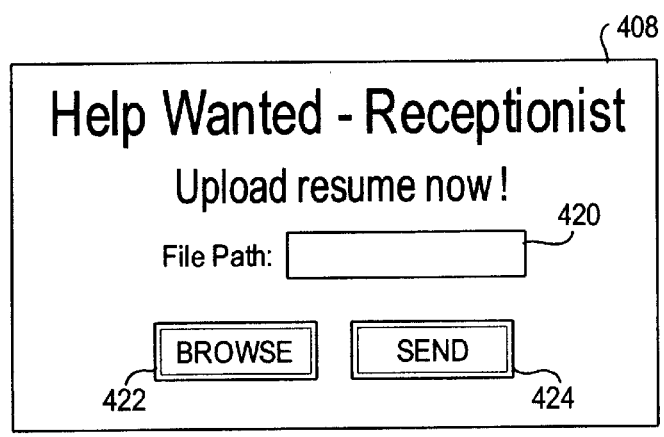

The embodiment of FIGS. 4A–4E is similar to that of FIGS. 3A–3G, except that the medium is a newspaper rather than a Yellow Pages directory. It is contemplated that the newspaper will be a metropolitan daily or weekly with a classified advertisement section, although the invention overall is not so limited. As shown in FIG. 4A, an advertisement 400 in the newspaper, which may be a display classified advertisement, a text classified advertisement, or a non-classified advertisement appearing anywhere in the newspaper, includes a jump code 402. The URL for the Web site required for entry of jump codes, which would usually be the URL for the Newspaper's own Web site, can be printed elsewhere in the newspaper, e.g., at the beginning of the classified advertisement section or at another location where readers can easily find it. When the user accesses the Web site by use of the URL, the user sees a Web page 404, as shown in FIG. 4B, into which the jump code can be entered in the box 406. When the user enters the jump code, the user is shown a Web page 408 specific to the advertisement, as shown in FIG. 4C, featuring a view 410 of the item being advertised and additional information 412 on the item. If the item advertised is a vehicle as shown in FIG. 4D, the Web page 408 can show pictures 414 and technical details 416 of the vehicle and contact information 418 for the seller. If the item advertised is a house or other real estate, the Web page can show pictures of the real estate and a comprehensive home listing. If the advertisement is a help-wanted advertisement, as shown in FIG. 4E, the Web page can permit the user to post a resume, which will be forwarded to the employer's e-mail address or to a private online P.O. box provided by the newspaper for the employer. The file path of the resume on the user's computer can be typed into the box 420 or located using the "Browse" button 422. Either way, the file is sent using the "Send" button 424. In general, things such as promotions can be displayed, as described above.

Use of the present invention with print media is not limited to advertisements. Instead, the use of jump codes in the editorial content of a print publication such as a newspaper or magazine provides references from the print publication to its companion Web site. Such references can accomplish such goals as giving readers instant access to the publication's most up-to-date Web news coverage, supplemental information, and third-party links referenced in the print editorial content. They can also refer readers to Web boards or real-time chat channels for discussion of current events or issues. Referring back to FIG. 1, the publication 110 can be implemented as a newspaper or magazine, in which case the entries are editorial content (e.g., news articles, news analysis, features, or editorials). Of course, the specialized Web site 108 can be provided as part of the publication's companion Web site, in which case the URL can be printed in the publication. The jump codes can then provide the reader with easy links to additional information such as the following:

updates to fast-breaking news stories linked from the print edition to that story's constantly updated page on the publication's companion Web site;

links to relevant Web sites, links pages, and other third-party Web sites referenced in print articles, and accessible via the publication's companion Web site; and links to interactive discussion forums on the publication's companion Web site.

Figure 5A:
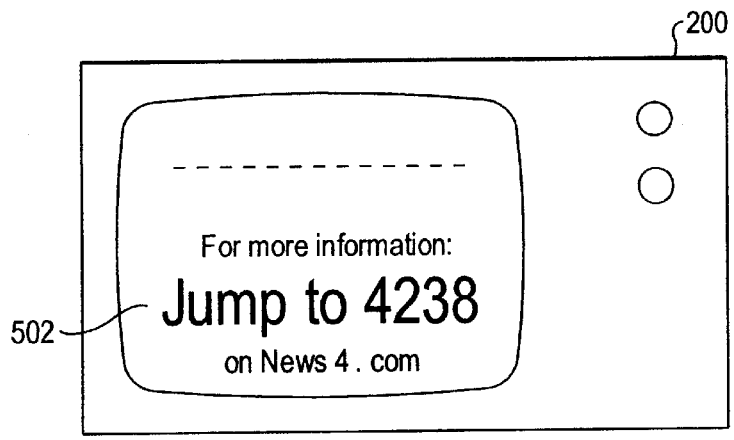
FIGS. 5A–5D show an embodiment of the present invention for use with a television program.
Figure 5B:
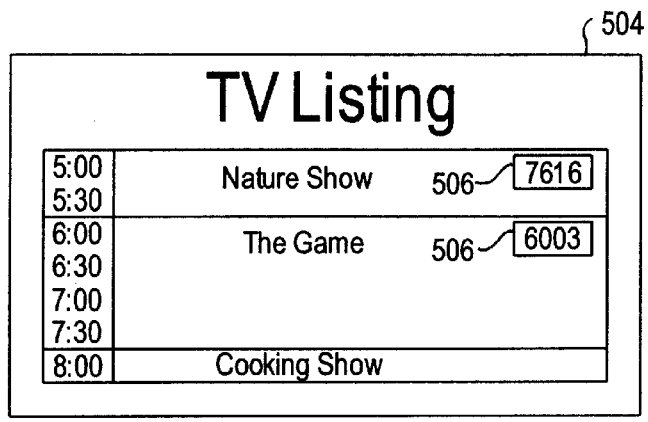
Figure 5C:
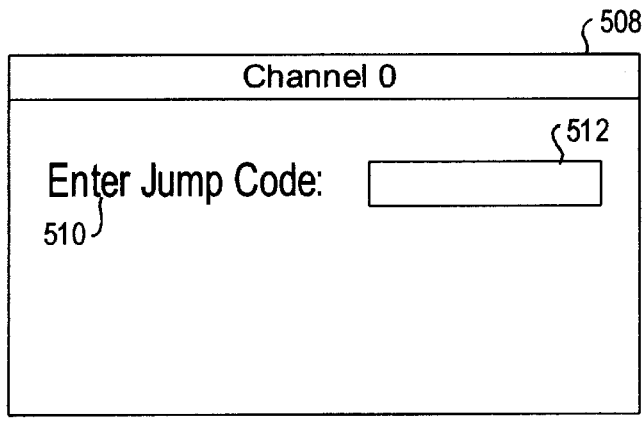

Yet another embodiment of the invention works with media such as radio and television, including broadcast, cable and satellite media. Similarly to the previous embodiments, a specific Web URL for entry of the jump codes is provided, e.g., to a specific station or network. As shown in FIG. 5A, during a television program received and shown on a television set 200, a jump code 502 can be displayed to allow a user to obtain more information on the topic of the television program. Alternatively, the jump code can be displayed during a commercial, similarly to those used in print advertisements as described above. As a further alternative, as shown in FIG. 5B, jump codes 506 for specific shows can be included in program listings 504, whether printed in local newspapers or provided through the cable system for viewing on screen.

Of course, during a radio program, the jump code can simply be announced; that is especially useful for people who listen to the radio in their cars, since such people must memorize the provided contact information rather than write it down while driving. When they reach a computer, they need not remember the specific URL for the additional information; instead, they need remember only the jump code and the URL for the home page of the radio station.

As described above, when the user enters the URL, the user sees a Web page 508 having a frame 510 with a box into which the jump code can be entered. The user can access the Web page using a personal computer or WAP-enabled device, or any other Internet-capable access device as described above.

Figure 5D:
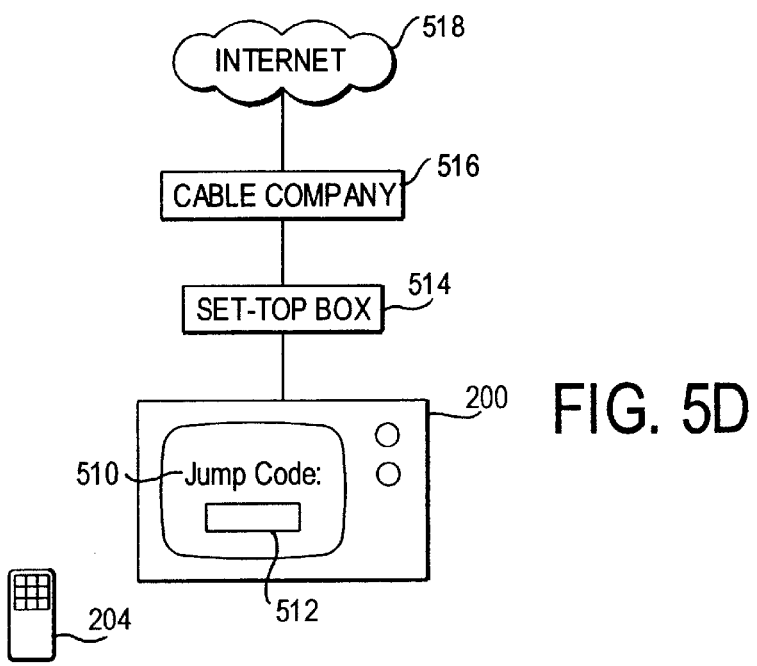

Alternatively, as shown in FIG. 5D, in a cable television system 516 that has been upgraded for bi-directional access to the Internet 518, an entry window (frame) 510 having a box 512 for receiving the jump code can be programmed into the set-top box 514. With that latter system, the user can enter the jump code and view the additional information without leaving the television set 200, simply by using the remote control 204 to call up the entry window 510 and enter the jump code. Since remote controls are much more likely to have numeric keys than a complete alphanumeric keypad, accessing a URL is considerably simplified.

As noted above, in the specific embodiments described above, jump codes need to be unique only within a publication, a television station, or the like, rather than throughout the world. Also, if desired, as jump codes become outdated, they can be reused; for example, a jump code from a back issue of a newspaper or from a television program that aired months ago can be reused after a sufficient time. Thus, jump codes can be kept to realistically useful lengths, e.g., four or five digits. Jump codes having fewer than four digits (such as the jump codes "1" or "44") may also be utilized, and since there is added value and convenience in jump codes which are less than four digits, such shorter jump codes will be perceived as being of higher value and attractiveness to publishers and advertisers. The code (e.g., CGI code) used to resolve the jump code entered by the user can be configured to accept jump codes of variable lengths and, if necessary, to perform any needed zero-filling or the like.

In any of the embodiments described above, the information linked using a jump code can be generally available or can be targeted, e.g., to users of a specific Yellow Pages directory, readers of a specific publication, or listeners to a specific radio station. For example, a promotional offer can be extended only to persons who have listened to a particular radio program.

Although only various preferred embodiments are specifically illustrated and described herein, it will be appreciated that many modifications and variations of the present invention are possible in light of the above teachings and within the purview of the appended claims without departing from the spirit and intended scope of the invention. For example, jump codes can be published in White Pages directories as well as Yellow Pages directories. Also, the Yellow Pages and newspaper embodiments can be expanded to any sort of publication that has text or display advertising, such as magazines. Therefore, the present invention should be construed as limited only by the appended claims.

What is claimed is:

1. A method for providing access to preselected locations on the Internet, comprising the steps of:

publishing, in a publication that includes advertisements, a compilation of preselected Internet locations, said published compilation including a unique predetermined jump code assigned to each of said preselected Internet locations published therein and comprising a jump code printed in at least one of the advertisements, wherein the unique predetermined jump codes are assigned to be unique only within the publication;

providing a predetermined Internet location comprising means for capturing a desired jump code assigned to a desired preselected Internet location which is one of said preselected Internet locations, said desired jump code being entered by a user after said predetermined Internet location has been accessed;

accessing said predetermined Internet location and entering said desired jump code into said predetermined Internet location;

receiving said jump code entered into said predetermined Internet location after said jump code has been captured at said predetermined Internet location;

converting the received jump code to a URL address corresponding to the desired preselected Internet location; and accessing said desired preselected Internet location using said URL address corresponding to said desired preselected Internet location corresponding to said received jump code.

2. The method of claim 1, wherein the publication is a Yellow Pages directory for a geographical area, and wherein the compilation comprises at least one jump code printed in a display advertisement in the Yellow Pages directory.

3. The method of claim 2, wherein the display advertisement is for a restaurant.

4. The method of claim 2, wherein the display advertisement is for a physician or health-care provider.

5. The method of claim 2, wherein the display advertisement is for an automobile dealer.

6. The method of claim 2, wherein the display advertisement is for a retail store.

7. The method of claim 1, wherein the publication is a newspaper.

8. The method of claim 7, wherein the compilation comprises at least one jump code printed in a display advertisement in the newspaper.

9. The method of claim 7, wherein the compilation comprises at least one jump code printed in a classified advertisement in the newspaper.

10. The method of claim 9, wherein the classified advertisement is a for-sale classified advertisement.

11. The method of claim 9, wherein the classified advertisement is an advertisement for real estate.

12. The method of claim 9, wherein the classified advertisement is a help-wanted classified advertisement.

13. A method for providing access to preselected locations on the Internet, comprising the steps of:

publishing a compilation of preselected Internet locations, said published compilation including a unique predetermined jump code assigned to each of said preselected Internet locations published therein, wherein the unique predetermined jump codes are assigned to be unique only within the compilation;

providing a predetermined Internet location comprising means for capturing a desired jump code assigned to a desired preselected Internet location which is one of said preselected Internet locations, said desired jump code being entered by a user after said predetermined Internet location has been accessed;

accessing said predetermined Internet location and entering said desired jump code into said predetermined Internet location;

receiving said jump code entered into said predetermined Internet location after said jump code has been captured at said predetermined Internet location;

converting the received jump code to a URL address corresponding to the desired preselected Internet location; and accessing said desired preselected Internet location using said URL address corresponding to said desired preselected Internet location corresponding to said received jump code;

wherein said desired preselected Internet location comprises a promotional savings coupon or other promotional offer.

14. A method for providing access to preselected locations on the Internet, comprising the steps of:

publishing a compilation of preselected Internet locations, said published compilation including a unique predetermined jump code assigned to each of said preselected Internet locations published therein, wherein the unique predetermined jump codes are assigned to be unique only within the compilation;

providing a predetermined Internet location comprising means for capturing a desired jump code assigned to a desired preselected Internet location which is one of said preselected Internet locations, said desired jump code being entered by a user after said predetermined Internet location has been accessed;

accessing said predetermined Internet location and entering said desired jump code into said predetermined Internet location;

receiving said jump code entered into said predetermined Internet location after said jump code has been captured at said predetermined Internet location;

converting the received jump code to a URL address corresponding to the desired preselected Internet location; and accessing said desired preselected Internet location using said URL address corresponding to said desired preselected Internet location corresponding to said received jump code;

wherein said desired preselected Internet location comprises at least one of a map and text directions to a business establishment.

15. A method for providing access to preselected locations on the Internet, comprising the steps of:

publishing a compilation of preselected Internet locations, said published compilation including a unique predetermined jump code assigned to each of said preselected Internet locations published therein, wherein the unique predetermined jump codes are assigned to be unique only within the compilation;

providing a predetermined Internet location comprising means for capturing a desired jump code assigned to a desired preselected Internet location which is one of said preselected Internet locations, said desired jump code being entered by a user after said predetermined Internet location has been accessed;

accessing said predetermined Internet location and entering said desired jump code into said predetermined Internet location;

receiving said jump code entered into said predetermined Internet location after said jump code has been captured at said predetermined Internet location;

converting the received jump code to a URL address corresponding to the desired preselected Internet location; and accessing said desired preselected Internet location using said URL address corresponding to said desired preselected Internet location corresponding to said received jump code;

wherein the compilation comprises an advertisement for an item being offered for sale, with the desired jump code included in the advertisement, and wherein the desired preselected Internet location comprises a photograph of the item being offered for sale.

16. A method for providing access to preselected locations on the Internet, comprising the steps of:

publishing a compilation of preselected Internet locations, said published compilation including a unique predetermined jump code assigned to each of said preselected Internet locations published therein, wherein the unique predetermined jump codes are assigned to be unique only within the compilation;

providing a predetermined Internet location comprising means for capturing a desired jump code assigned to a desired preselected Internet location which is one of said preselected Internet locations, said desired jump code being entered by a user after said predetermined Internet location has been accessed;

accessing said predetermined Internet location and entering said desired jump code into said predetermined Internet location;

receiving said jump code entered into said predetermined Internet location after said jump code has been captured at said predetermined Internet location;

converting the received jump code to a URL address corresponding to the desired preselected Internet location; and accessing said desired preselected Internet location using said URL address corresponding to said desired preselected Internet location corresponding to said received jump code;

wherein the desired preselected Internet location provides for transmission of an electronic document file.

17. A method for providing access to preselected locations on the Internet, comprising the steps of:

publishing, in conjunction with a radio or television medium, a unique predetermined jump code assigned to a preselected Internet location, wherein the unique predetermined jump codes are assigned to be unique only within the radio or television medium;

providing a predetermined Internet location comprising means for capturing the jump code assigned to the preselected Internet location, said jump code being entered by a user after said predetermined Internet location has been accessed;

accessing said predetermined Internet location and entering said jump code into said predetermined Internet location;

receiving said jump code entered into said predetermined Internet location after said jump code has been captured at said predetermined Internet location;

converting the received jump code to a URL address corresponding to the preselected Internet location; and accessing said preselected Internet location using said URL address corresponding to said preselected Internet location corresponding to said received jump code.

18. The method of claim 17, wherein the step of publishing is performed over the radio or television medium.

19. The method of claim 18, wherein the step of publishing takes place during a radio or television show, and wherein the preselected Internet location comprises information related to a topic of the radio or television show.

20. The method of claim 17, wherein the step of publishing is performed in a program listing for the radio or television medium.

21. A method for providing access to preselected locations on the Internet, comprising the steps of:

publishing, in a printed publication that includes editorial content, a compilation of preselected Internet locations, said published compilation including a unique predetermined jump code assigned to at least one of said preselected Internet locations published therein, said unique predetermined jump code being printed in conjunction with the editorial content, wherein the unique predetermined jump codes are assigned to be unique only within the printed publication;

providing a predetermined Internet location comprising means for capturing a desired jump code assigned to a desired preselected Internet location which is one of said preselected Internet locations, said desired jump code being entered by a user after said predetermined Internet location has been accessed;

accessing said predetermined Internet location and entering said desired jump code into said predetermined Internet location;

receiving said jump code entered into said predetermined Internet location after said jump code has been captured at said predetermined Internet location;

converting the received jump code to a URL address corresponding to the preselected Internet location; and accessing said preselected Internet location using said URL address corresponding to said preselected Internet location corresponding to said received jump code.

22. The method of claim 21, wherein the printed publication is a periodical publication.

23. The method of claim 22, wherein the preselected Internet locations comprise an Internet location providing later news on a subject described in the periodical publication.

24. The method of claim 22, wherein the preselected Internet locations comprise an Internet location allowing readers of the periodical publication to discuss a subject described in the periodical publication.

* * * * *